United States Patent [19]
Marom et al.

[11] Patent Number: 5,504,595
[45] Date of Patent: Apr. 2, 1996

[54] HOLOGRAPHIC SCANNING

[75] Inventors: Emanuel Marom; Joseph Katz, both of Stony Brook; Edward Barkan, Miller Place, all of N.Y.

[73] Assignee: Symbol Technologies, Inc., Bohemia, N.Y.

[21] Appl. No.: 225,350

[22] Filed: Apr. 8, 1994

Related U.S. Application Data

[63] Continuation of Ser. No. 894,509, May 26, 1992, abandoned.

[51] Int. Cl.⁶ .............................. G02B 5/18; G02B 5/32; G02B 26/10; G02B 27/44
[52] U.S. Cl. .................... 359/16; 359/17; 359/18
[58] Field of Search ........................... 359/17, 18, 15, 359/16; 235/457

[56] References Cited

U.S. PATENT DOCUMENTS

| | | | |
|---|---|---|---|
| 1,561,149 | 11/1925 | Gage | 359/565 |
| 2,679,474 | 5/1954 | Pajes | 359/565 |
| 3,309,162 | 3/1967 | Kosanke et al. | 359/565 |
| 3,536,371 | 10/1970 | Post | 359/565 |
| 3,547,546 | 12/1970 | Schier | 359/565 |
| 3,619,033 | 11/1971 | McMahon | 359/18 |
| 4,103,991 | 8/1978 | Kramer . | |
| 4,106,844 | 8/1978 | Bryngdahl et al. . | |
| 4,165,464 | 8/1979 | Ikeda et al. | 359/18 |
| 4,304,459 | 12/1981 | Kramer . | |
| 4,333,006 | 6/1982 | Gorin et al. . | |
| 4,353,615 | 10/1982 | Kramer et al. . | |
| 4,415,224 | 11/1983 | Dickson | 359/18 |
| 4,583,816 | 4/1986 | Kramer . | |
| 4,610,500 | 9/1986 | Kramer . | |
| 4,626,062 | 12/1986 | Ishikawa | 359/18 |
| 4,639,071 | 1/1987 | Matsumoto et al. | 359/18 |
| 4,712,852 | 12/1987 | Funato et al. | 359/18 |
| 4,779,944 | 10/1988 | Ritter et al. . | |
| 4,786,126 | 11/1988 | Kramer . | |
| 4,810,046 | 3/1989 | Yamagishi et al. | 359/18 |
| 4,826,268 | 5/1989 | Kramer . | |
| 4,830,443 | 5/1989 | Hecker et al. | 359/18 |
| 4,852,956 | 8/1989 | Kramer . | |
| 4,973,112 | 11/1990 | Kramer . | |
| 5,046,794 | 9/1991 | Ritter et al. . | |
| 5,182,659 | 1/1993 | Clay et al. | 359/18 |

FOREIGN PATENT DOCUMENTS

| | | | |
|---|---|---|---|
| 58-106519 | 6/1983 | Japan | 359/18 |
| 3-192318 | 8/1991 | Japan | 359/18 |
| 3-208011 | 9/1991 | Japan | 359/18 |
| 3-257418 | 11/1991 | Japan | 359/18 |
| 1416310 | 12/1975 | United Kingdom | 359/18 |

*Primary Examiner*—Martin Lerner
*Attorney, Agent, or Firm*—Fish & Richardson

[57] ABSTRACT

A holographic grating element is provided which enables tracing different scan lines. The element is divided into a plurality of sectors. A first grating pattern is provided which diffracts a beam in one direction, and a second grating pattern is next to the first and diffracts the scan beam in the reverse direction. Sectors can be produced with different sector sizes to enable scanning at different rates in the reverse direction, or in successive scans in the same direction. Angle relationships are described to produce diffraction patterns for a desired relationship between disc rotation and the angle of the scan line.

11 Claims, 13 Drawing Sheets

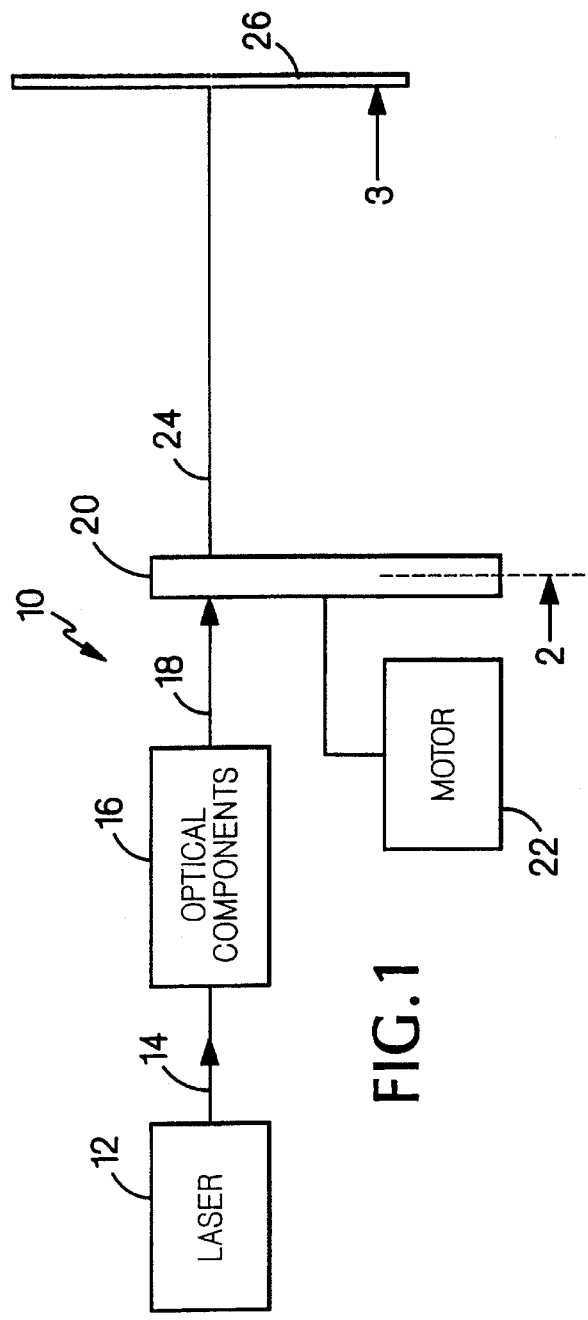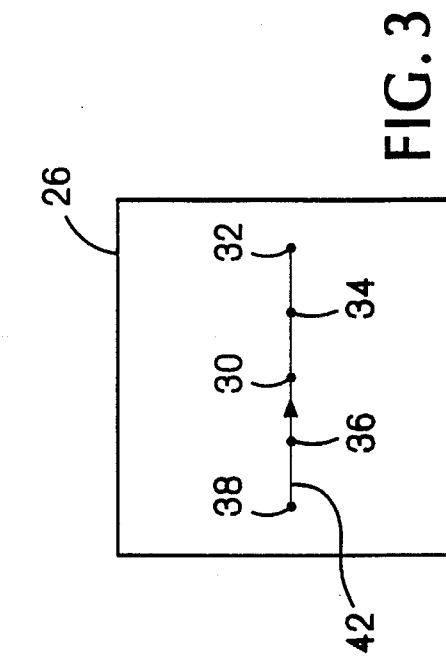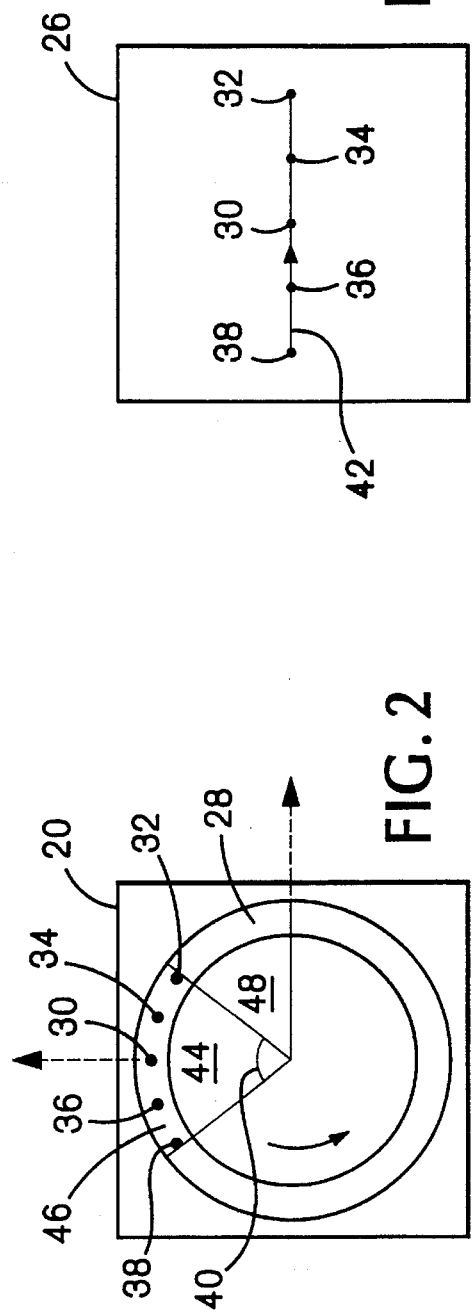

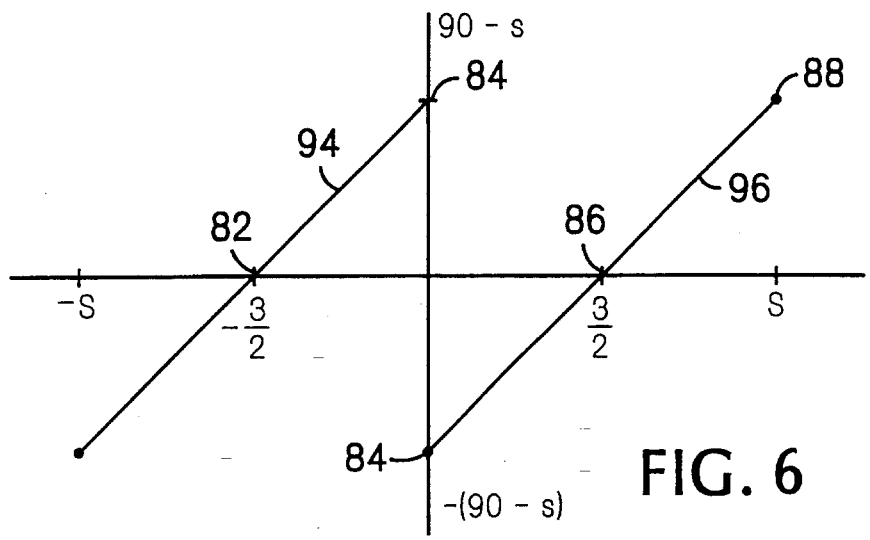
FIG. 6
(1) $(\vec{x}\cos\epsilon + \vec{y}\sin\epsilon) \cdot (\vec{x}\sin\phi + \vec{y}\cos\phi) \cdot \cos\theta_i$
(2) $(\cos\epsilon)(\sin\phi) + (\sin\epsilon)(\cos\phi) = \cos(90+\phi)$
(3) $\sin(\phi + \epsilon) = \cos(90+\phi)$
(4) $\phi + \epsilon = 90 - (90+\phi)$
(5) $\boxed{\epsilon \cdot -2\phi}$
FIG. 8
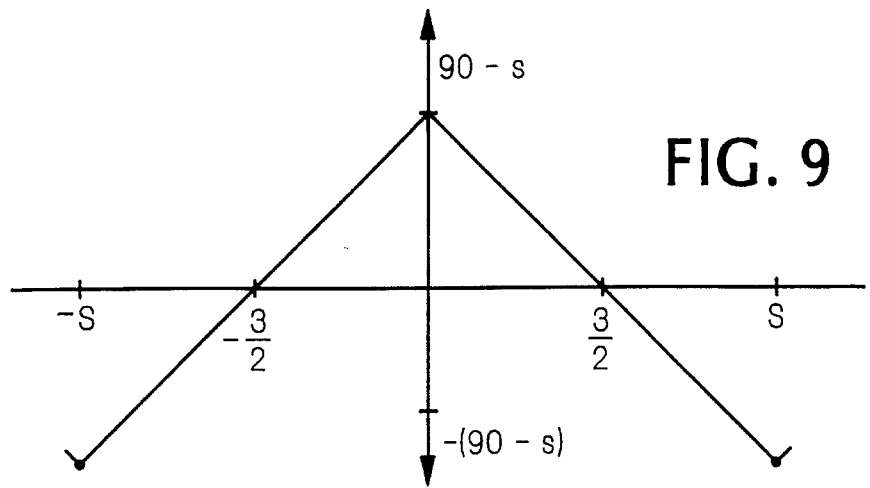
FIG. 9

(1) $[\rho \sin\phi, \rho \cos\phi]$ (2) $[\rho \sin\phi + \Delta \cos\in, \rho \cos\phi + \Delta \sin\in]$ (3) $[\rho \sin\phi + \Delta \cos 2\phi, \rho \cos\phi + \Delta \sin 2\phi]$ (4) $\rho_n^2 = (\rho \sin\phi + \Delta \cos 2\phi)^2 + (\rho \cos\phi - \Delta \sin 2\phi)^2$ (5) $\boxed{\rho_n \approx \rho - \Delta \sin\phi}$ (6) $\tan\phi_n = \dfrac{\rho \sin\phi + \Delta \cos 2\phi}{\rho \cos\phi - \Delta \sin 2\phi}$ (7) $\boxed{\tan\phi_n \approx \tan\phi + \dfrac{\Delta}{\rho \cos\phi}}$

FIG. 10

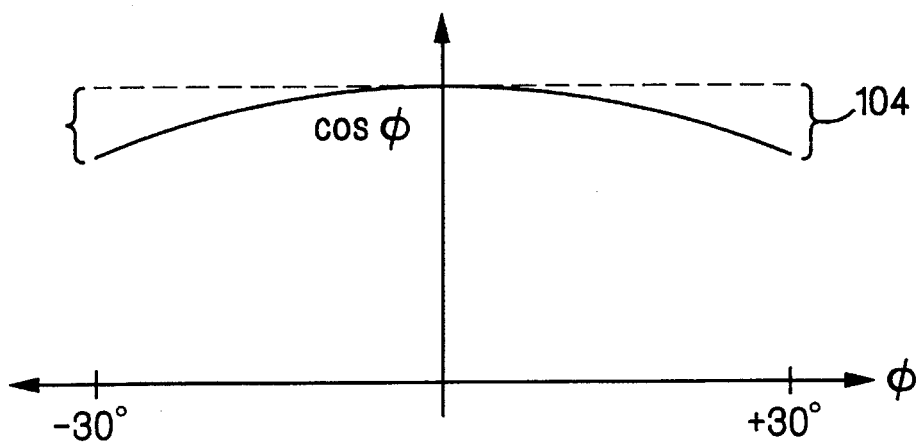

FIG. 11

(1) $\quad \sin(\phi + \epsilon) = \cos(90 - K\phi)$ (2) $\quad \phi + \epsilon = K\phi$ (3) $\quad \boxed{\epsilon = (K - 1)\phi}$ DIRECT (4) $\quad \sin(\phi + \epsilon) = \cos(90 + K\phi)$ (5) $\quad \phi + \epsilon = -K\phi$ (6) $\quad \boxed{\epsilon = -(K + 1)\phi}$ INVERSE (7) $\quad \boxed{\rho_n = \rho + \Delta \sin K\phi}$ (8) $\quad \boxed{\tan \phi_n = \tan \phi + \frac{\Delta}{\rho} \cdot \frac{\cos K\phi}{\cos^2 \phi}}$ (9) $\quad \boxed{\rho_n = \rho - \Delta \sin K\phi}$

(10) $\quad \boxed{\tan \phi_n = \tan \phi + \frac{\Delta}{\rho} \cdot \frac{\cos K\phi}{\cos^2 \phi}}$

FIG. 13

HOLOGRAPHIC SCANNING

This is a continuation of application Ser. No. 07/894,509, filed May 26, 1992, now abandoned.

BACKGROUND OF THE INVENTION

This invention relates to holographic scanning, and more particularly to scanning a bar code symbol.

One use of scanning, and particularly laser scanning, is for reading a bar code symbol, which is a symbol with regions having different light reflective properties. One form of bar code symbol consists of elements which are in a series of bars and spaces that are typically rectangular in shape with a variety of possible widths. The specific arrangement of elements defines the characters represented according to a set of rules and definitions specified by the code or symbology used. One example of a symbology is the Uniform Product Code found on many food products.

In known scanning systems, a light beam is directed toward a target that includes a bar code symbol on the surface. The scanning functions by repetitively sweeping the light beam in a line or series of lines across the symbol. Scanning systems also include a sensor or photodetector which detects light reflected from the symbol. A portion of the reflected light which is reflected off the symbol is detected and converted into an electrical signal, and electronic circuitry or software decodes the electric signal into a digital representation of the data represented by the symbol that has been scanned.

A diffraction grating element can be used to direct a laser beam for scanning purposes. One scanning technique includes use of a laser beam directed at a rotating disc with a diffraction grating, also called a hologon. The grating can be produced optically, but for higher visibility can be computer generated. The beam is diffracted and forms a scan line that moves linearly as the hologon is rotated by a motor. If the entire disc consists of one type of pattern, or if there are multiple sectors with the same pattern, the scan line proceeds from a beginning point to a termination point, then returns to the beginning point before the next scan. This is called unidirectional scanning.

SUMMARY OF THE INVENTION

This invention features an apparatus for tracing scan lines with a diffraction grating element. An element is provided which receives a beam of coherent radiation, such as a laser light beam, and causes at least two characteristically different scan lines to be traced in sequence. In preferred embodiments, the element comprises sectors which have diffraction grating patterns. A first sector causes the beam to be traced in one direction, and a second sector, causes the beam to be traced in the reciprocal direction. The second scan line can trace a path continuously or discontinuously with respect to the first scan line. If discontinuous, the second scan can retrace a portion of the first scan in the opposite direction, or can have some offset from the first scan and be in the same or reciprocal direction.

In another embodiment, the sectors have different sizes so that the first and second scan lines are traced at different rates, even though the motor that turns the element may be rotating at a constant rate. A plurality of sectors can be used so that scan lines are traced at different rates in the same direction.

In another embodiment, an apparatus which includes bow correction is employed so that the gratings are made denser at the ends of the sectors by a certain density factor.

Other features and advantages of the invention will be apparent from the following description of a preferred embodiment, and from the claims.

BRIEF DESCRIPTION OF THE DRAWINGS

FIG. 1 is a block diagram of the laser scanning system and rotating hologon of the invention.

FIG. 2 is a front view (taken along 2—2 in FIG. 1) of the hologon, showing one sector of the hologen.

FIG. 3 shows how a line is traced in an image plane at locations corresponding to points on the hologon sector of FIG. 2.

FIG. 6 is a graph relating the angle of disc rotation to the scan angle for the two sectors of FIG. 5.

FIG. 8 shows the derivation of a slope relationship for the inverse sector of FIG. 7.

FIG. 9 is a graph relating the angle of disc rotation and the scan angle for a disc which has alternating direct and inverse sectors such as FIGS. 4 and 7.

FIG. 10 is a set of equations for deriving the next point, given a previous point and incremental change.

FIG. 11 shows the bow that conventionally results when a laser beam is used to illuminate a hologon.

FIG. 13 is a set of equations which derive angular relationships for a proportional relationship between the angle of disc rotation and the scan line angle.

DESCRIPTION OF THE PREFERRED EMBODIMENTS

Figure 4:
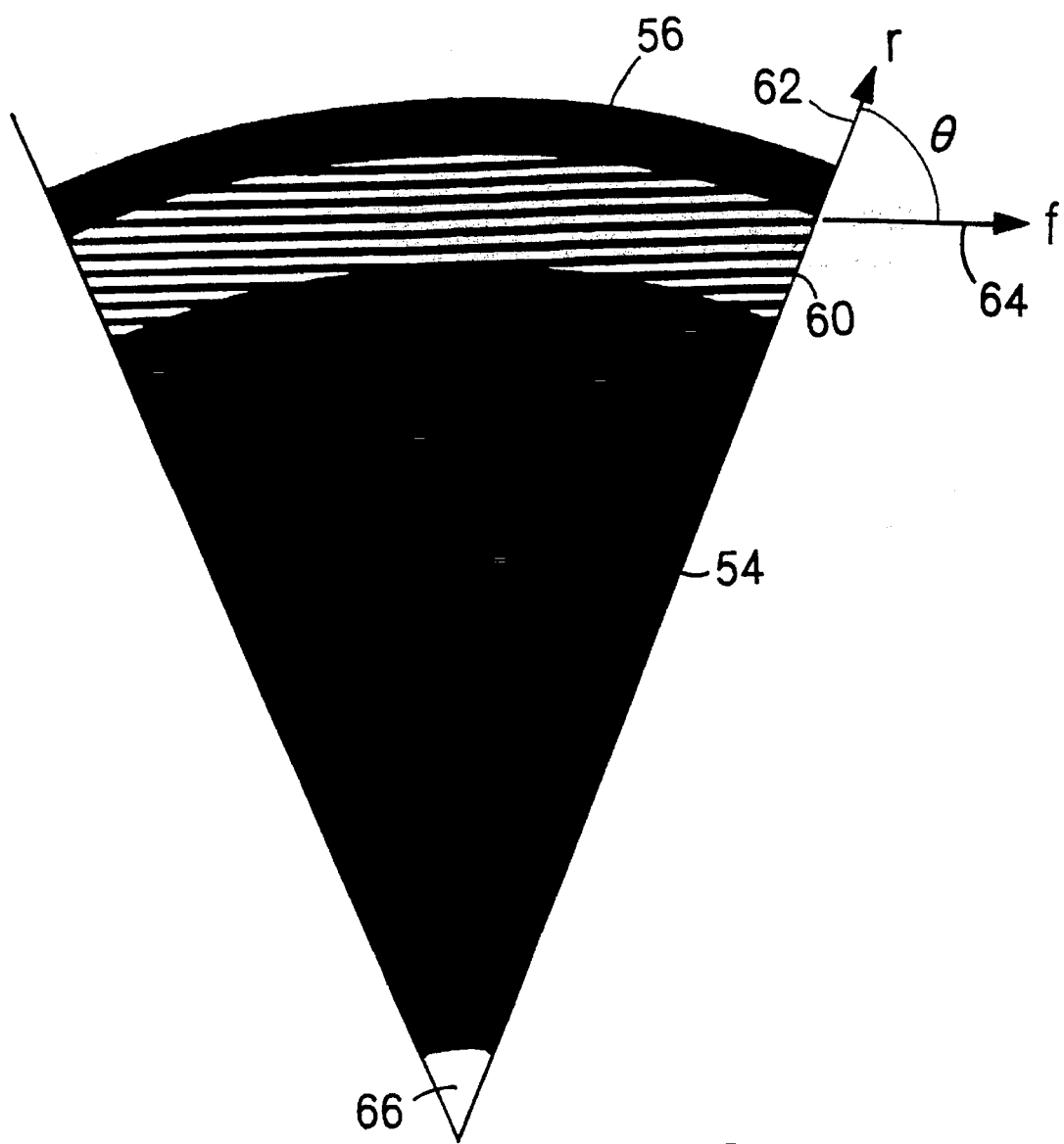
FIG. 4 shows a hologon with generally parallel grating lines.

A simplified block diagram of the laser scanning system 10 is shown in FIG. 1. Laser source 12 emits light beam 14 through optical components 16, which can include a lens, a series of lenses, apertures, pinholes, et al. Components 16 direct the beam 18 to hologon 20. Hologon 20 is a disc with a diffraction grating pattern which diffracts beam 18 to cause beam 24 to trace scan lines in image plane 26. Hologon 20 is rotated at constant speed and in one direction by motor 22.

A front view of hologon 20 is shown in FIG. 2. The optically significant portion of the hologon is an annular region 28. Annular region 28 contains the diffraction grating pattern. Beam 18, as shown in FIG. 1, forms spot 30 on hologon 20. As hologon 20 is rotated by motor 22 (FIG. 1) spot 30 moves around annular region 28.

FIG. 3 shows a scan line 42 in the image plane 26 produced by rotation of hologon 20 through the sector shown in FIG. 2. Spots 30–38 in FIG. 2 correspond to points 30–38 along the scan line in FIG. 3. Thus, as hologon 20 rotates through the sector angle shown in FIG. 2, scan line 42 is traced. The scan begins at point 38 and continues to point 32. If the diffraction grating pattern within the sector of FIG. 2 is repeated in successive sectors positioned around annular region 28 of the hologon, the scan of FIG. 3 will be repeated, once for every sector. Each scan will begin at point 38 and end at point 32.

FIG. 4 shows a grating consisting of generally parallel lines in the annular region 56 of sector 54, referred to as the direct sector. (FIG. 4 and other drawings of the grating lines are not to scale; in general, the gratings shown are much coarser than would be the case in actual devices.) As the geometry of this fringe pattern is described, it should be understood that terms such as "vertical" or "horizontal" are used solely for convenience to describe the figures, and are not meant to be limiting. As shown here, $\phi$ is the angle of rotation of hologon 20 relative to the radial vector that is orthogonal to the grating lines. The angle between radial vector 62 and fringe direction 64 is defined as $\theta$. Note that $\phi+\theta=90°$.

Light diffracts in a direction perpendicular to the grating lines at a tilt $\alpha$ defined by $\sin\alpha=\lambda/d$, where d is the fringe separation. When hologon 20 rotates by an angle $\phi$, the angle of the straight fringes with respect to the radial vector (r) is $\theta$, so light diffracts in the transverse direction at an orientation of 90 - $\theta$, which is $\phi$. Therefore, a rotation of the disk by $\phi$ generates a change in diffraction of $\phi$, and so the diffracted beam scans an angle proportional to the sector angle 66. The proportionality occurs because the beam is deflected and scanned, thus making the spot in the image plane cover an angle of $\pm\sin\alpha\sin\phi$. The scanned angle is the angle between the diffracted beam in the image plane at one end of the sector and at the other end of the sector, i.e., in FIGS. 2 and 3, the angle between the beam at points 38 and 32 in FIG. 3.

The angle of the fringe 64 with respect to the horizontal in terms of $\phi$, as the sector 54 is held stationary as in FIG. 4, is defined as $\epsilon$. For the pattern shown in FIG. 4, $\epsilon$ always equals 0. The importance of $\epsilon$ will be more clear when the fringe pattern does not consist of parallel lines.

Figure 5:
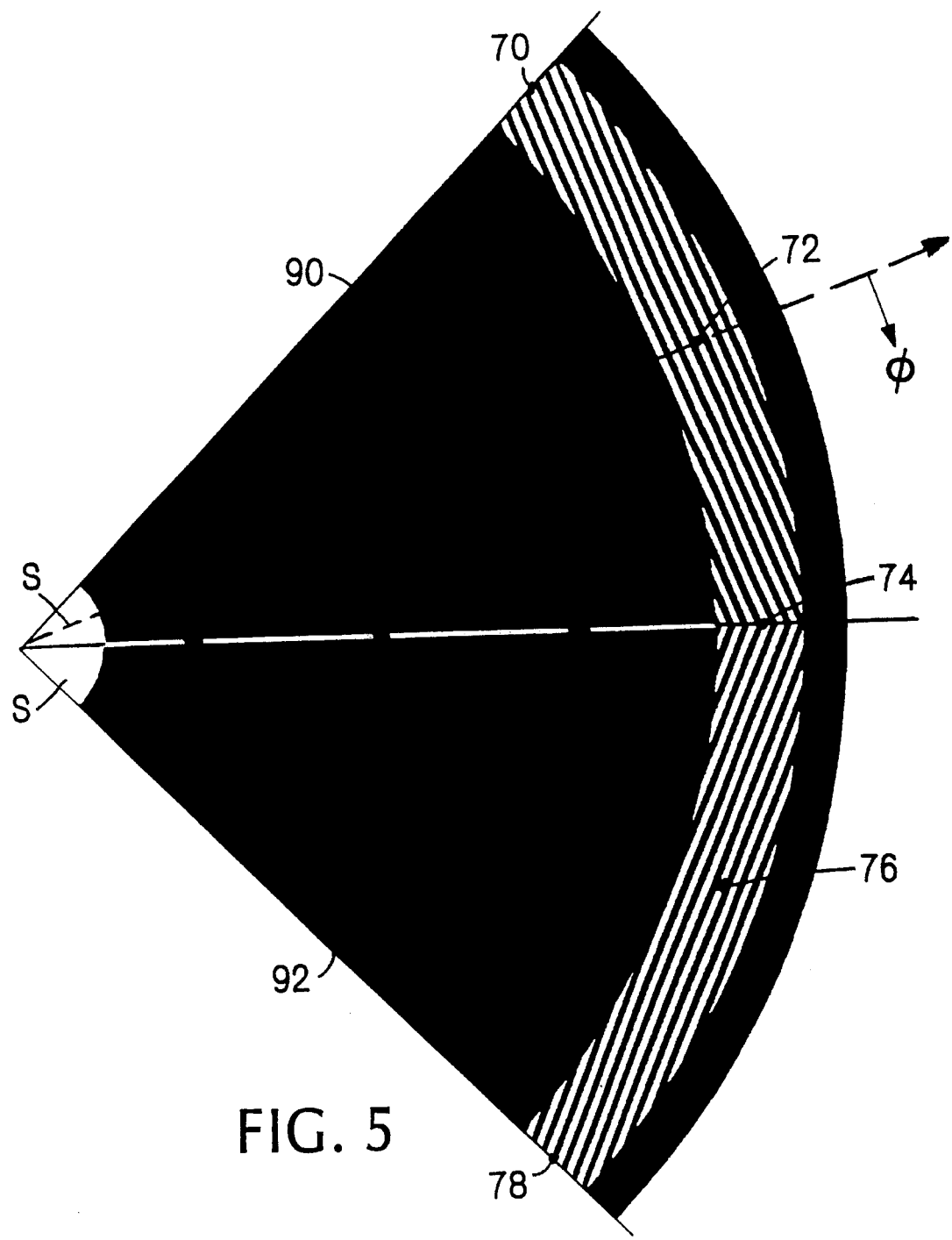
FIG. 5 shows two hologon sectors, each with generally parallel lines.

FIG. 5 shows two sectors, each of the type shown in FIG. 4. The sector angle is defined as s. As the two sectors of FIG. 5 are rotated, the relationship between $\phi$ and $\theta$ is shown in FIG. 6. Points 70–78 correspond to $\phi$ values 80–88. Sector 90 corresponds to line 94 in FIG. 6, and sector 92 corresponds to line 96. In FIG. 6, there is a discontinuity at $\phi=0$, where one sector ends and the other starts.

Figure 7:
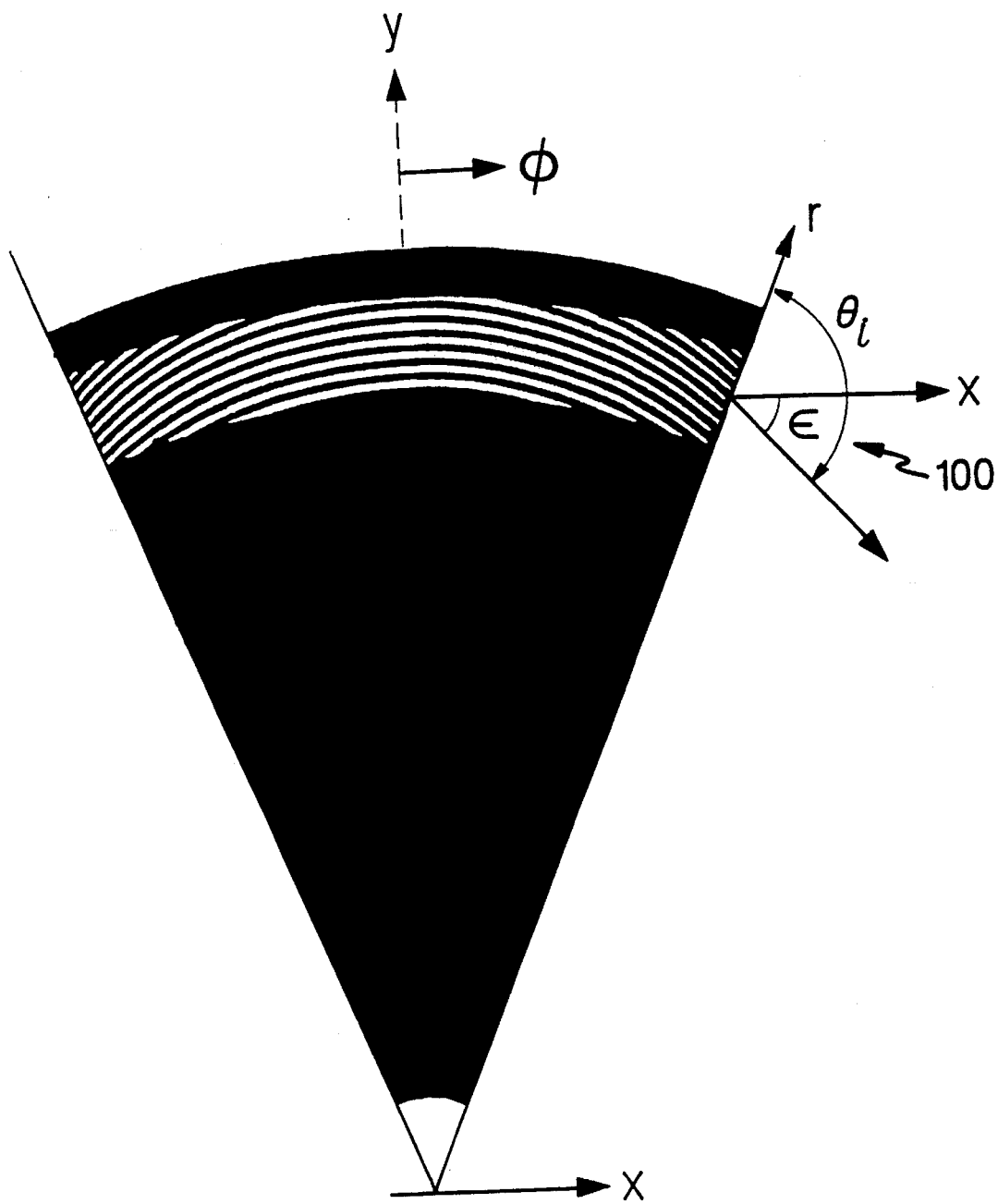
FIG. 7 shows an inverse hologon sector for use in conjunction with the direct sector of FIG. 4.

In order to eliminate this discontinuity and allow continuous bi-directional scanning, a fringe pattern such as the one in FIG. 7 follows the direct sector, and is called an inverse sector. The sectors positioned one after the other are described as two sectors even though they may form a continuous fringe pattern which produces a continuous bi-directional scan line.

As noted previously, as the disc rotates by an angle in the $\phi$ direction and the beam crosses a direct sector, the diffracted beam scans an angle proportional to the angle of rotation. To scan in reverse, therefore, while still rotating the hologon 20 in one direction, a rotation of the disc by $\phi$ should produce a change in the fringe tilt angle by $-\phi$. Therefore, $\theta_i=90+\phi$, in the inverse sector. Note that in FIG. 7, unlike FIG. 4, $\epsilon$ has a non-zero value since there is an angle between the horizontal X-axis and the fringe (shown at 100 in FIG. 7). The equations in FIG. 8 show the relationship between $\epsilon$ and $\phi$. Equation 1 reflects the fact that the dot product of the unit radius vector and unit fringe vector equals the cosine of $\theta_i$ in this section. This equation results in a relationship between $\epsilon$ and $\phi$ as shown in equation 5 of FIG. 8. This means that for each line drawn from the origin through the annulus, $\phi$ is known and $\epsilon$ can be determined therefrom. The result is the fringe pattern as shown in FIG. 7.

Figure 7A:
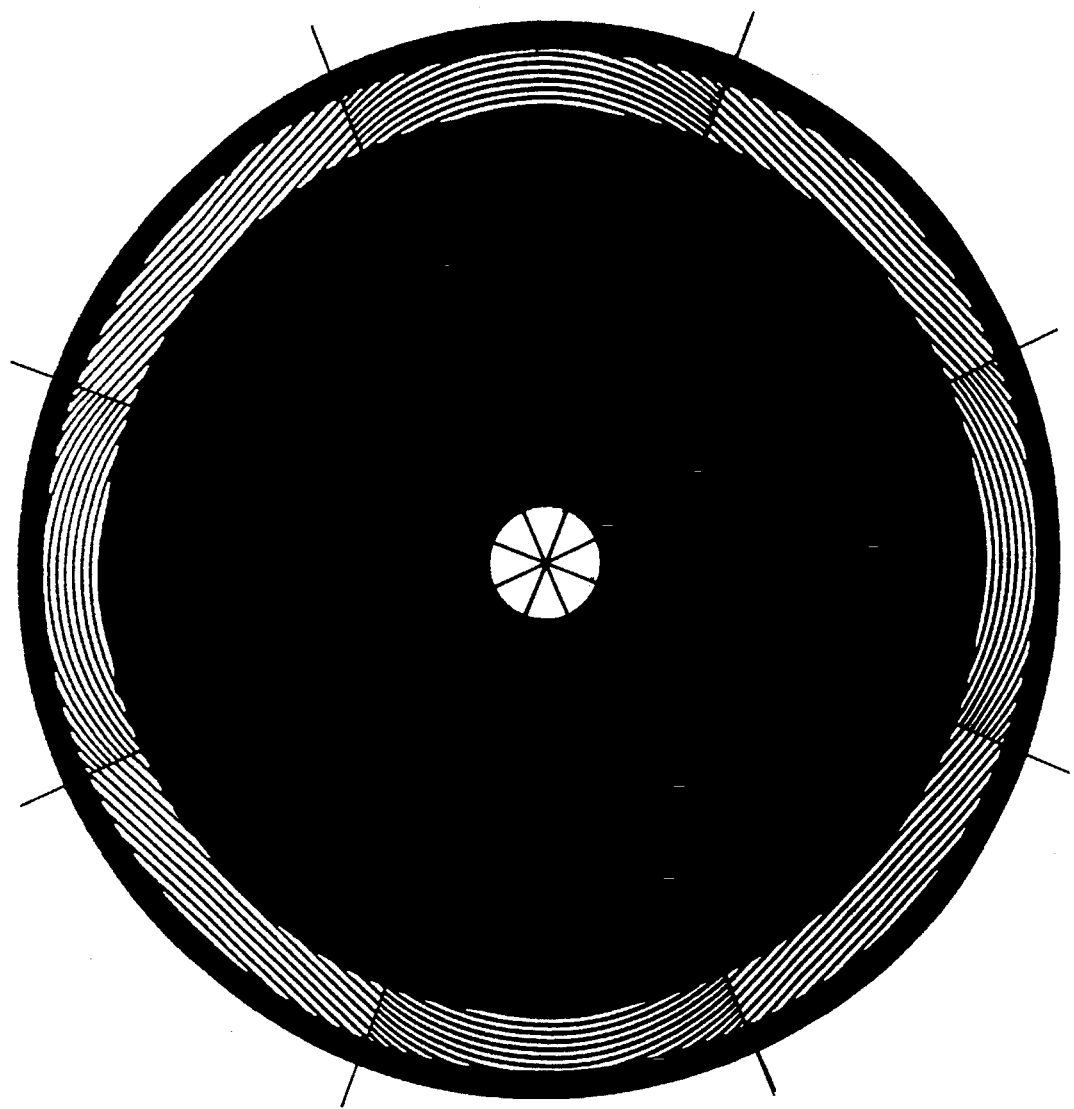
FIG. 7A shows a disc with alternating direct and inverse sectors.

FIG. 7A shows a disc with four direct and four inverse alternating sectors, each 45°. The sectors alternate to create four bi-directional scans per rotation.

A comparison can be made between FIG. 6 and FIG. 9. FIG. 9 is based on two sectors of a hologon, as shown in FIG. 4, except an inverse sector like that depicted in FIG. 7 is substituted for the sector 92. There is no longer the significant discontinuity in the position of the scanning spot. The scan in the direct sector ends at $\phi=0$, and immediately begins in reverse in the inverse sector.

The inverse scan generally re-traces the direct sector scan, though it should be noted that some astigmatism will generate an elliptical scanning spot, i.e. the beam shape generated by the inverse scan may not be exactly as the one formed by the direct sector, causing an elliptical shape. This astigmatism should be corrected by optical means, most likely external to the device, although a combination of the device and the corrector is possible by proper design of the width and tilt of the fringe. This design could correct the beam shape, but only at some limited range of distances, which could be sufficient for scanning purposes. Furthermore, optical elements are used to correct for distortion that occurs in the inverse direction due to the curved fringes.

Referring to FIG. 10, these equations show the derivation for a new point $(\rho_n, \phi_n)$, for an incremental distance $\Delta$ along the fringe. Equation 5 shows the derivation of the new $\rho$, and equation 7 shows the derivation of the new $\phi$ in terms of its tangent.

In order to determine the density of fringes in the direct section, for a desired first order of diffraction along a direction determined by an angle $\alpha$, the fringe spacing should be $\lambda/\sin\alpha$, where $\lambda$ is the radiation wavelength. Since first order of diffraction has usually the highest efficiency, the design is such that desired scan is generated by the first diffraction order.

Figure 12:
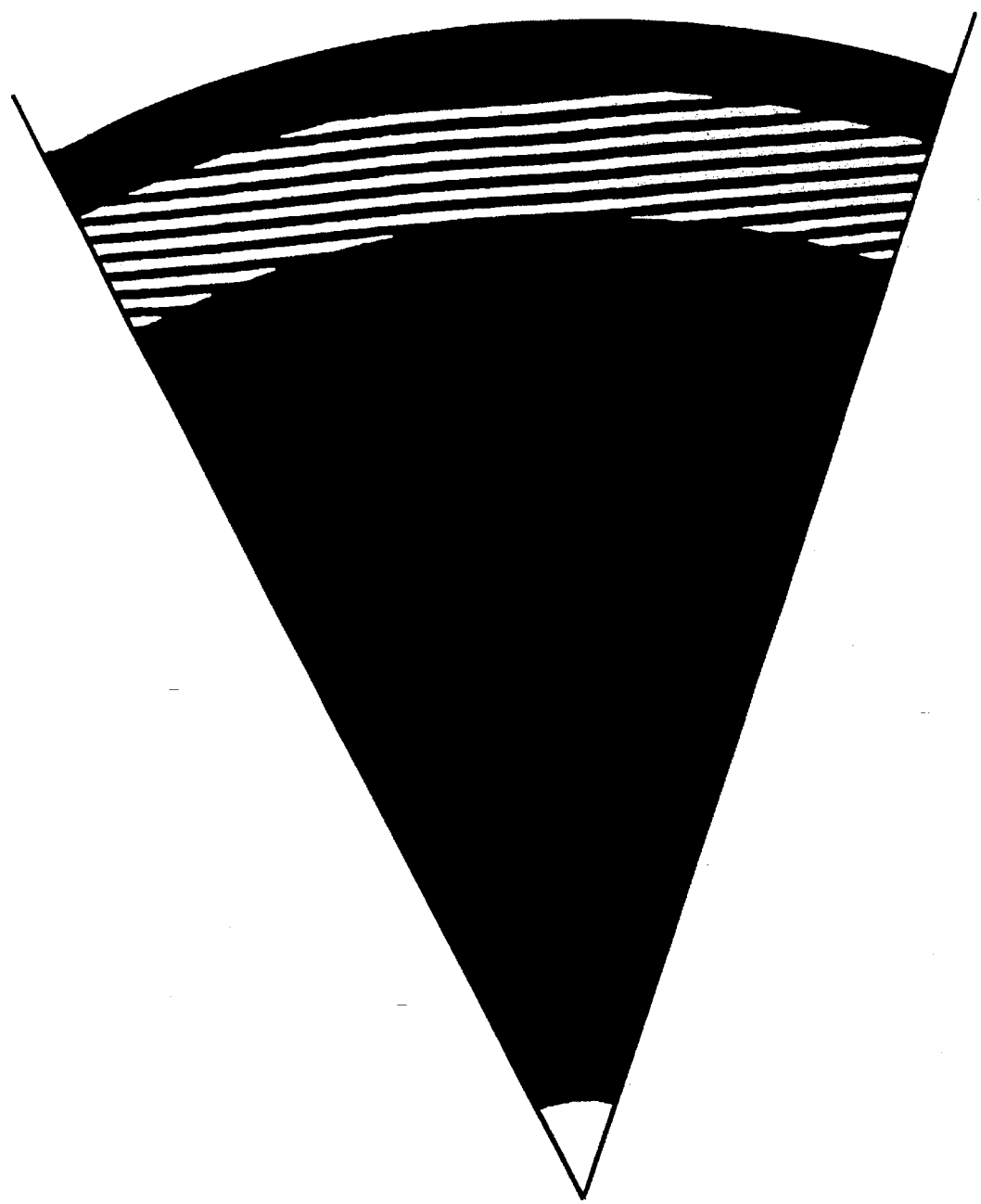
FIGS. 12, 12A, and 12B show fringes that have been modified according to the invention to correct the bow.

When the rotating grating is illuminated by a light beam, the trace of the diffracted beam forms a circle. For scanning purposes, only a sector portion of the circle is used. The trace is inherently curved, producing a bowed scanning line. In the direct sector, the spacing between the fringes, d, does not remain constant relative to the y-axis. Rather, spacing relative to the y-axis is $d/\cos\phi$ as the hologon is rotated. As noted above, light diffracts in a direction perpendicular to the scan line at a tilt which is a function of 1/d. Referring to FIG. 11, in a sector having an angle of +30°, for example, the scan is offset by about 13% at the edge 104 in comparison to the value at the center. In order to keep the vertical spacing and the diffraction angle constant, and thus to correct for this bow, the fringe lines are made denser by a factor of $1/\cos\phi$ as they approach the edge. FIG. 12 shows a bow corrected version of FIG. 4. In both figures, there are six spaces at the edge, but at the center there are seven spaces in FIG. 4, and six spaces in FIG. 12. Thus the edge of FIG. 12 is more dense relative to the center, compared to FIG. 4.

Figure 12A:
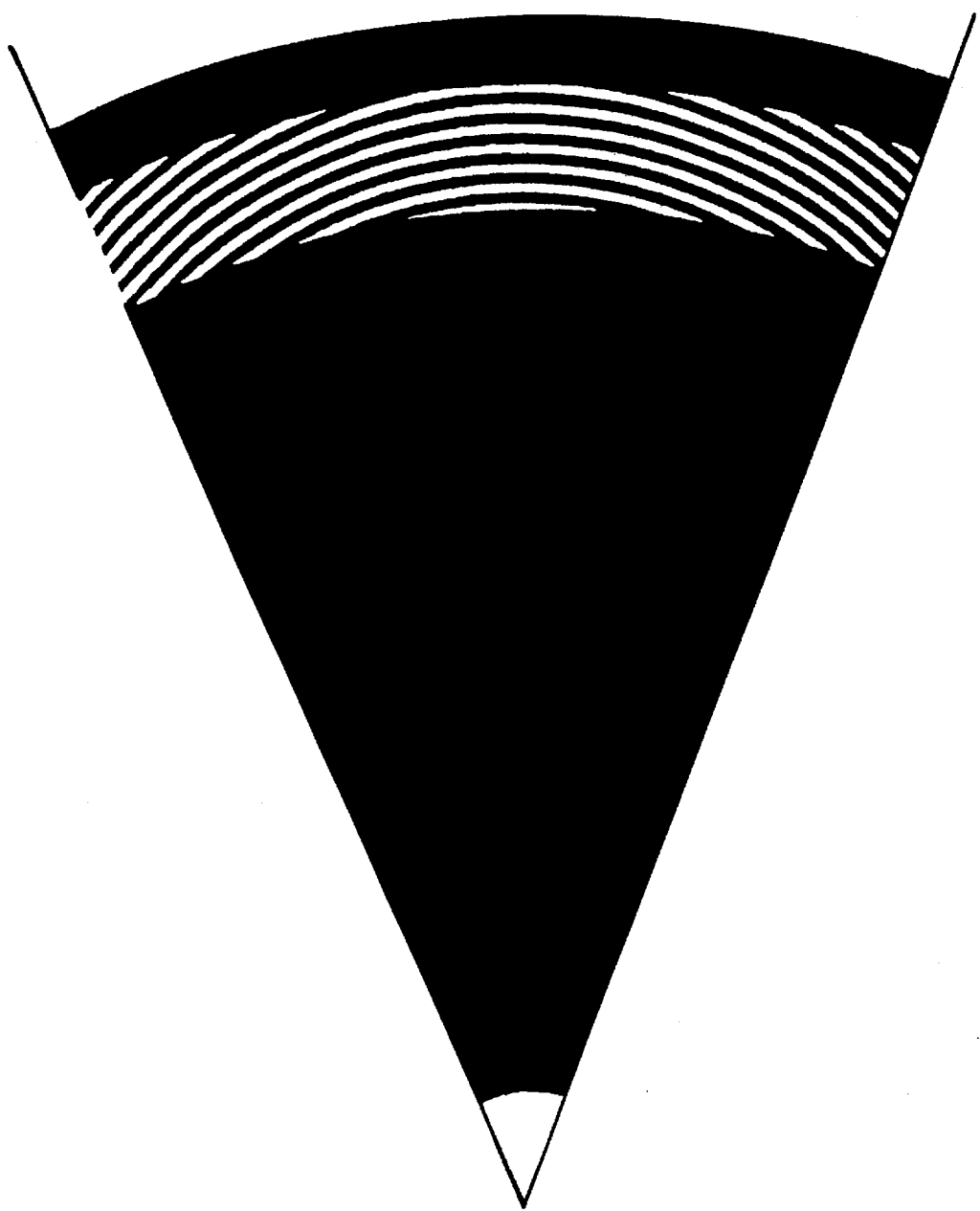

In the inverse sector with curved fringes, the bow begins and ends higher to the center relative to the y-axis. Therefore the reverse situation occurs, and the fringes should be less dense at the edge. This difference is clearly visible by comparing the nine spaces at the edge of FIG. 7 and the six spaces at the edge of the FIG. 12A bow corrected sector.

Figure 12B:
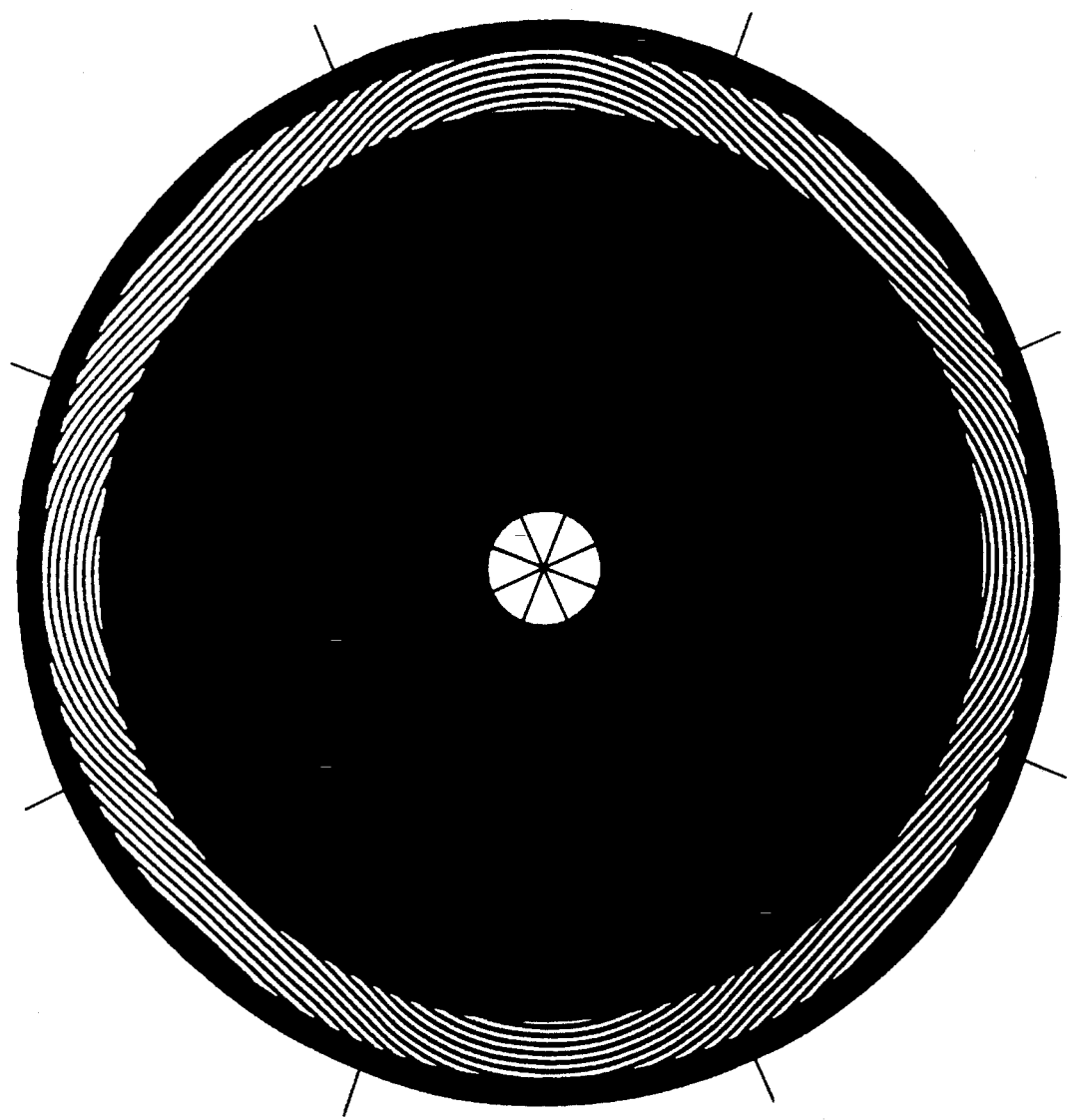

FIG. 12B shows bow corrected sectors corresponding to the discs in FIG. 7A. Without bow correction, the direct scan starts and ends below the center, and the inverse scan starts and ends above the center, causing a vertical discontinuity. With bow correction, the scans are both straighter, and therefore there is virtually no discontinuity.

The scanner can be designed so that the scanning angle or range is not equal to the angular extent of each sector, but rather is proportional to it. In this situation, for a rotation of angular extent $\phi$, the scanning angle varies by $K\phi$. E.g., if the sector of the disc is 30° and K=2, then the angle of scan will be the same as that from a 60° sector. In this case, fringes will be tilted in both the direct and inverse sectors. Only when K=1 is the fringe tilt $\epsilon$ everywhere zero in the direct sector. The relationship of $\epsilon$ to $\phi$ is shown by equations 3 and 6 in FIG. 13. Equation 3 shows the relationship between $\epsilon$ and $\phi$ in the direct region. Equation 6 shows the relationship in the inverse sector. When k=1, equations 9 and 10 correspond to equations 5 and 7 of FIG. 10 for an inverse sector.

Figure 14:
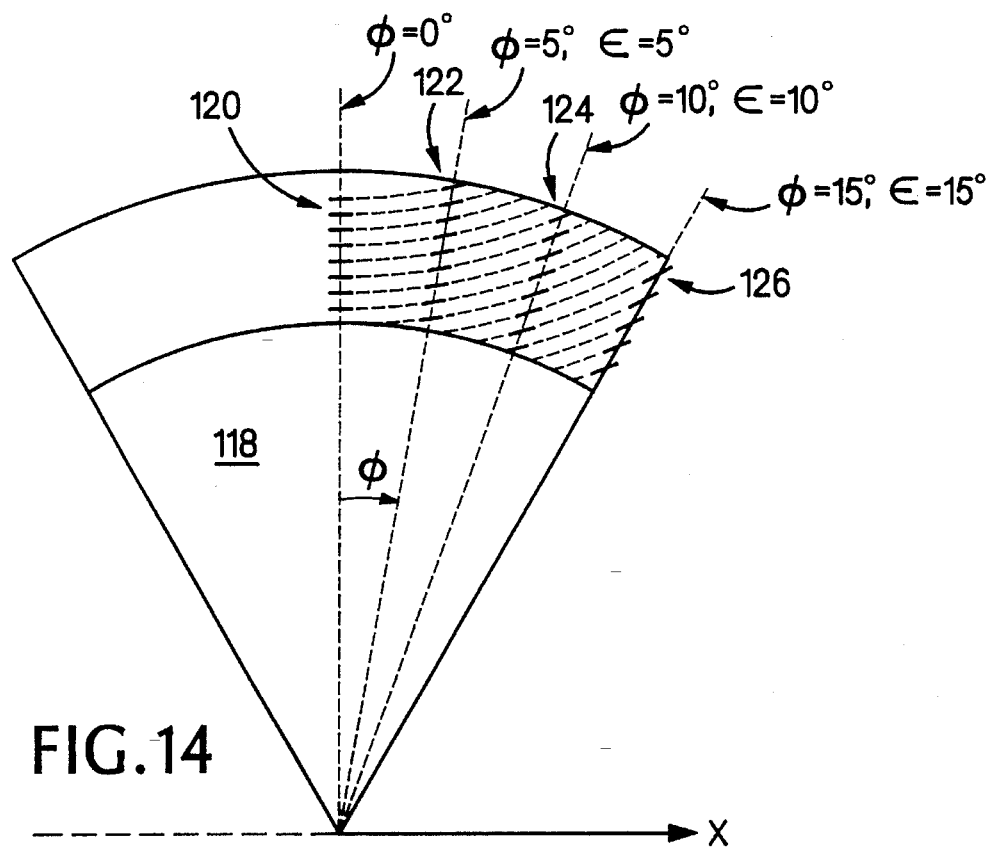
FIGS. 14 and 15 graphically show how the relationships are used to produce a grating pattern.
Figure 15:
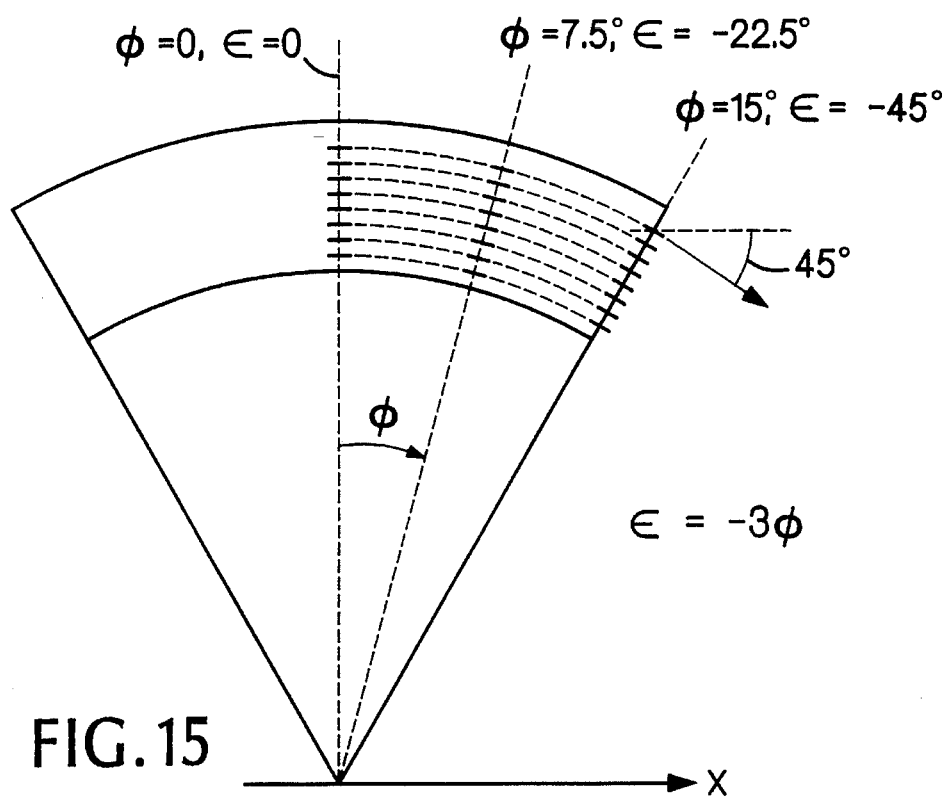

The effect of K is graphically depicted in FIGS. 14 and 15. If K=2, then $\epsilon=\phi$ in the direct sector, and $\epsilon=-3\phi$ in the inverse sector. Sector 118 in FIG. 14 is 30° total. Dashed lines are shown for $\phi=5°$, 10°, and 15°, with corresponding sets of hash marks 122, 124, and 126. Each set of hash marks should be at an angle $\epsilon=\phi$, where $\epsilon$ is measured with respect to the x-axis. The pattern would be created by connecting the marks, as shown by the dashed lines. Note here that the direct sector has fringes that are not straight, but nevertheless are less curved than those for the inverse sector. This observation holds true for positive K, and of course negative K means nothing except reversing the names of the sectors.

The direct sector is preferably between 30 degrees and 45 degrees. Many variations in sector sizes are possible, though one must keep in mind that there are 360 degrees to a circle, and the hologon should ordinarily contain the same number of direct and inverse sectors if one desires a continuous bi-directional scanning beam.

Although the sectors have generally been described or depicted as equal, successive or alternating sectors can have different angles. For example, each direct sector can have the same sector angle, and each inverse sector can have a different, preferably larger, angle. For example, the direct sectors could have sector angles of 30°, and the inverse sectors could have sector angles of 60° or even 90°. The inverse sectors are preferably made larger since the astigmatism of the resulting beam is reduced for larger sectors which require less curved fringes.

For example, assuming a direct sector of 30° and an inverse sector of 60°, and a scan line that is 30° from the hologon, K=1 in the direct sector and K=½ in the inverse sector. Since a 60° rotation yields a 30° scan, $\epsilon=-3/2\phi$. As shown with reference to FIGS. 14 and 15, this is enough information to determine everywhere the slopes of the fringes in the pattern.

Another alternative would be to have sectors of varying size, e.g. 30°, 45°, 45°, and 60°, so that the direct and inverse sectors each scan at rates different from the previous scan in the same direction. The digitizing process involved in decoding, when the analog signal is transformed into a digital signal, depends on the frequency bandwidth of the analog signal. Having consecutive traces with different scanning velocities increases the decoding probability of different barcode densities. For a 30° scan line from the hologon for the sector width chosen above, one has K=1, ⅔, ⅔, and ½ respectively, and $\epsilon=0$, $-5/3\phi$, $-1/3\phi$, and $-3/2\phi$. Again, these sectors can be formed as indicated in FIGS. 14 and 15. Increased sector size in the inverse sector can reduce astigmatism, and thus reduce elliptic distortion.

In addition, with different "equivalent spot" sizes in the two directions, the usefulness of the scan is extended. Different velocities, as obtained by unequal sectors, produce different equivalent spot sizes when the electronic circuit bandwidth is taken into account. Thus the probability of detecting a variety of barcodes increases when one can scan with different velocities.

Figure 16:
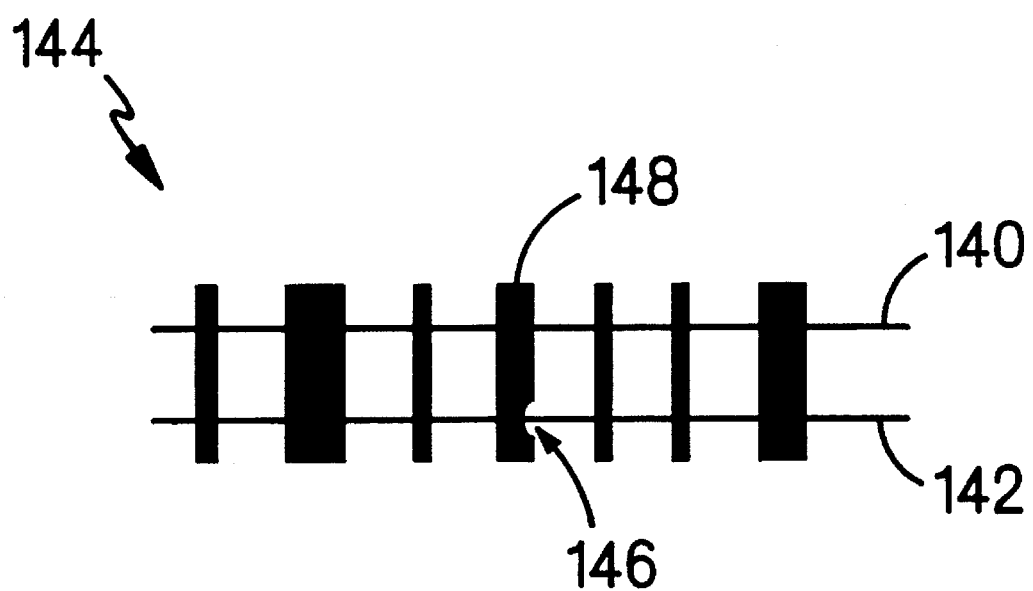
FIG. 16 is a pictorial representation of scan lines over a bar code symbol.

Referring to FIG. 16, it may be desirable to have a discontinuity between the direct and inverse sector scans, or to have two scan lines 140 and 142 vertically offset. A sector which moves the scan line vertically (by changing the density of the fringe lines) could be positioned intermediate the direct and inverse sectors for a rectangular shaped scan. Instead, the two sectors could cause discontinuous scans in the same direction or in opposite directions. As noted above with reference to bow correction, having the fringes closer together or farther apart, for example, can move the scan vertically, i.e., in the direction perpendicular to the scan.

In one useful application of this feature, a bar code symbol 144 may be difficult to read with scan line 142 due to a printing error, shown here at 146 on element 148, so that the element seems half the width. A successive second scan 140 vertically offset could avoid the printing error and the resulting decoding problem caused that could be caused by using the first scan only. For a one-dimensional bar code symbol like the one in FIG. 16, the vertical offset should be some distance less than the height of the bar code elements. These successive sectors could also have different scanning rates in one direction or in opposite directions.

Other embodiments of the invention are within the following claims. For example, coherent radiation other than a visible light beam could be used, e.g. acoustic, microwave, and millimeter waves.

What is claimed is:

1. An apparatus for tracing scan lines across a target, said apparatus comprising:

a source of coherent radiation positioned to deliver a beam along a beam path; and a diffraction grating element positioned along said beam path so that a portion of said element receives said beam and produces a diffracted beam, said element being mounted for rotation about an axis of rotation so that the portion receiving said beam varies with rotation, and said element having a diffraction grating pattern configured so that, as said element rotates, said diffracted beam traces a scan line across said target, wherein said grating element comprises a pattern of grating lines, and the spacing between adjacent grating lines varies along the extent of the grating lines so that said spacing in the portion of said element receiving said beam varies with the angle of rotation of said element, so that the path traced across said target by said scan line is straighter than the path that would be traced by a scan line produced by a diffraction element with fixed spacing between adjacent grating lines.

2. The apparatus of claim 1 wherein said source of coherent radiation is a laser beam source.

3. An apparatus for scanning a bar code symbol, said apparatus comprising:

a laser beam source positioned to deliver a beam along a beam path; and a diffraction grating element positioned along said beam path so that a portion of said element receives said beam and produces a diffracted beam, said element being mounted for rotation about an axis of rotation so that the portion receiving said beam varies with rotation, and said element having a diffraction grating pattern configured so that, as said element rotates, said diffracted beam traces a scan line across said bar code symbol, wherein said grating element comprises a pattern of grating lines, and the spacing between adjacent grating lines varies along the extent of the grating lines so that said spacing in the portion of said element receiving said beam varies with the angle of rotation of said element, so that the path traced across said target by said scan line is straighter than the path that would be traced by a scan line produced by a diffraction element with fixed spacing between adjacent grating lines.

4. The apparatus of claim 2 or 3 wherein said variation in spacing between grating lines is proportional to $1/\cos\phi$, wherein $\phi$ is said angle of rotation.

5. The apparatus of claim 2 or 3 wherein said element contains multiple sectors, and a plurality of said sectors each contain said grating lines of varying spacing for reducing bow in the scan line.

6. The apparatus of claim 5 wherein each said sector produces the same direction of scanning.

7. The apparatus of claim 5 wherein some of said sectors produce scans in one direction and other sectors produce scans in the reverse direction while the element rotates in the same direction.

8. The apparatus of claim 5 wherein at least some of said sectors each have a central region bounded by edge regions and further have grating lines of a density that is greater in the edge regions than in the central region.

9. The apparatus of claim 8 wherein the density of the grating lines in the edge regions of said at least some sectors is increased by a factor of about $1/\cos\phi$, wherein $\phi$ is the angle of rotation referenced from a radial vector that is orthogonal to the grating lines.

10. The apparatus of claim 5 wherein at least some of said sectors each have a central region bounded by edge regions and further have grating lines of a density that is greater in the central region than in the edge regions.

11. The apparatus of claim 10 wherein the density of the grating lines in the central region of said at least some sectors is increased by a factor of about $1/\cos\phi$, wherein $\phi$ is the angle of rotation referenced from a radial vector that is orthogonal to the grating lines.

* * * * *

UNITED STATES PATENT AND TRADEMARK OFFICE
CERTIFICATE OF CORRECTION

PATENT NO. : 5,504,595

DATED : April 2, 1996

INVENTOR(S) : Emanuel Marom, Joseph Katz, and Edward Barkan

It is certified that error appears in the above-identified patent and that said Letters Patent is hereby corrected as shown below:

Column 4, line 19, "4" should be --$\phi$--.

Column 4, line 56, "+" should be --$\pm$--.

Column 5, line 21, "region" should be --sector--.

Signed and Sealed this

Sixth Day of August, 1996

Attest:

BRUCE LEHMAN

*Attesting Officer*   *Commissioner of Patents and Trademarks*